April 13, 1965     E. F. HAMILTON     3,178,199

STROLLER

Original Filed Jan. 13, 1960

INVENTOR.
EARL F. HAMILTON,
BY
ATTORNEYS.

United States Patent Office 3,178,199
Patented Apr. 13, 1965

3,178,199
STROLLER
Earl F. Hamilton, Columbus, Ind., assignor to Hamilton Cosco, Inc., Columbus, Ind., a corporation of Indiana
Original application Jan. 13, 1960, Ser. No. 2,201, now Patent No. 3,063,729, dated Nov. 13, 1962. Divided and this application Sept. 10, 1962, Ser. No. 222,311
3 Claims. (Cl. 280—47.38)

This invention relates to a baby stroller, and more particularly to a stroller provided with a canopy readily movable between a first position, in which it is disposed above the stroller-seat, and a second position, in which it hangs downwardly from the stroller-handle and in rear of the seat. This application is a division of my prior application Serial No. 2,201, filed January 13, 1960, now Patent No. 3,063,729, granted November 13, 1962.

The conventional stroller embodies a wheeled base frame, a U-shaped pushing handle extending upwardly from said base frame, and a seat located in front of the handle. In accordance with this invention, the stroller is provided with a canopy comprising a U-shaped frame and a cover of fabric or like sheet material carried by said frame. The U-shaped frame, which is conveniently formed of a length of metal rod, has a front leg and two parallel side legs, the ends of which are bent into alignment with each other and pivotedly received in holes near the upper end of the handle. Spaced from their axis of pivotal connections to the handle, the side legs of the frame are bent to provide offsets which engage the handle to locate the canopy in a position over the stroller seat. By swinging the canopy upwardly and rearwardly from such position, it may be brought into a position in which it hangs downwardly from the handle in rear of the seat. If desired, the canopy may be provided with an adjustable rearward extension comprising a second U-shaped frame pivoted to the first mentioned frame on an axis spaced from that on which the first mentioned frame is connected to the handle.

Figure 1:
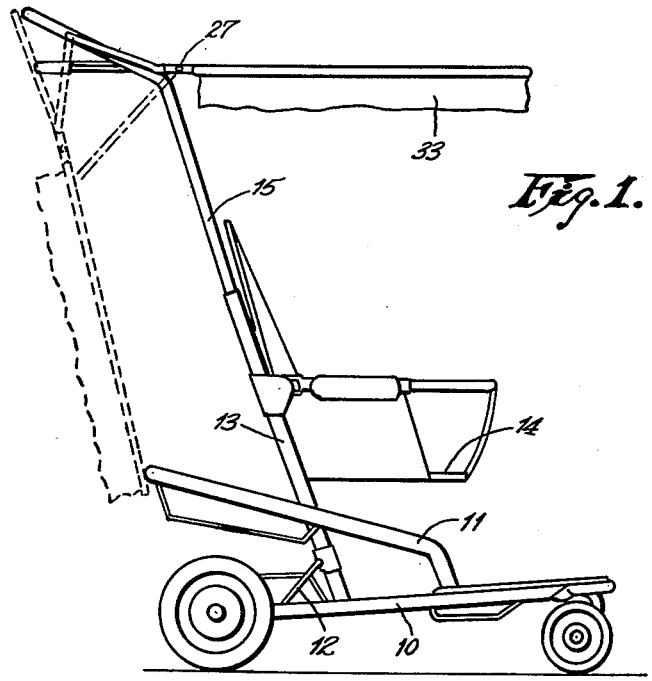
Figure 2:
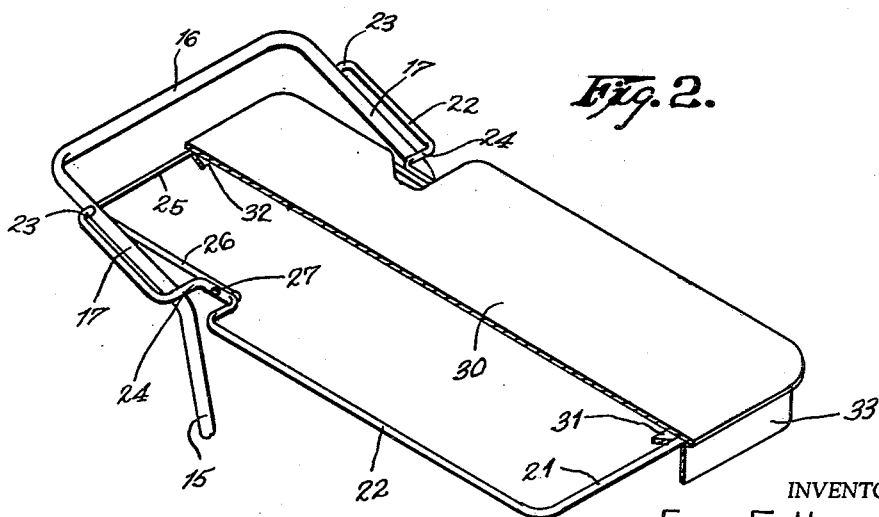

Other features of the invention will be apparent from the following more detailed description and from the accompanying drawing, in which:

FIG. 1 is a side elevation of a stroller; and
FIG. 2 is an isometric view of the canopy and its mounting, with a portion of the canopy-cover broken away.

The stroller shown in FIG. 1 and more fully illustrated and described in my aforesaid prior patent is of the foldable type. It comprises a wheel-supported base frame 10 which is connected through links 11 and 12 to a handle frame 13. In the illustrated erected condition of the stroller, the handle frame extends upwardly, preferably with a slight rearward inclination, from the base frame 10 and carries at its front an infant's seat 14. The sides of the handle frame shown are tubular and telescopically receive the parallel side legs 15 of a generally U-shaped handle which also includes an intermediate or upper leg 16. Desirably the side legs 15 of the handle are bent intermediate their length to provide upper positions 17 which project generally rearwardly of the stroller.

The canopy, which in accordance with the present invention is provided for the stroller above described, comprises a generally U-shaped main frame conveniently formed from a metal rod bent to provide a front leg 21 and two parallel side legs 22. The rear ends of the side legs are bent inwardly as indicated at 23 and pivotally received in holes in the outer faces of the handle portions 17. Spaced forwardly from the in-bent ends 23, the sides 22 are bent to provide inwardly projecting offsets 24 positioned to engage and rest on the sides of the stroller handle and thereby support the canopy in the horizontal position indicated in full lines in FIG. 1. The distance between the in-bent ends 23 and the offsets 24 is greater than the distance between the handle-leg 16 and the holes in the handle which receive the ends 23. As a result, the canopy can be swung upwardly and rearwardly from the full-line position into the dotted line position of FIG. 1, the offsets 24 clearing the handle-leg 16 by virtue of their greater distance from the axis about which the canopy swings.

In addition to the main frame 21–22 the canopy shown includes a U-shaped auxiliary or extension frame conveniently formed of a metal rod bent to provide a rear leg 25 and parallel side legs 26. At their front ends, the side legs 26 lie inside the offsets 24 and are pivotally secured thereto, as by means of rivets 27. Friction provided by the riveted connection is relied upon to hold the extension frame 25–26 in any desired position of adjustment relative to the main frame 21–22.

The two frames just described support a cover 30 of fabric or like sheet material provided at its ends with pockets 31 and 32 which receive respectively the front end of the main frame and the rear end of the extension frame. Adjacent to the offsets 24, the sides of the cover 30 are notched as indicated to prevent the cover from becoming pinched between the extension and main frames when the extension is adjusted above the axis of the rivets 27. If desired, the cover may include a valance 33.

When the canopy is to be used to provide shade for an infant occupying the seat 14, it is disposed in the full-line position shown in FIG. 1. With the canopy so disposed, its rearward extension can be pivotedly adjusted about the common axis of the rivets 27 into any desired position, including that indicated by chain lines in FIG. 1. If it is not desired to use the canopy to protect the infant, or if it is desired to get the canopy out of the way to facilitate placing the infant in or removing him from the seat, it can be swung about the common axis of its in-bent ends 23 so that it will hang downwardly in rear of the handle as indicated in dotted lines in FIG. 1. If it is desired to remove the canopy completely from the stroller, this can be done simply by springing the frame-sides 22 outwardly sufficiently far to withdraw the ends 23 from the holes in the sides of the handle.

I claim as my invention:
1. In combination with a stroller or like vehicle having a wheeled base frame, a seat, and a pushing handle projecting generally upwardly therefrom, a canopy comprising a border frame provided with spaced side members between which said handle is received, said border frame being pivoted to said handle on a horizontal axis spaced from the end of the handle, abutments on the border frame spaced from such axis in position to rest on the handle and support the canopy over said seat, and a canopy-extension pivotally connected to said border frame at the inner ends of said abutments.
2. The combination of claim 1 with the addition that said side members are the parallel legs of a U-shaped metal rod, said parallel legs being bent to provide inwardly projecting offsets constituting said abutments.

3. In combination with a stroller or like vehicle having a wheeled base frame and a pushing handle projecting generally upwardly therefrom, a canopy comprising main and auxiliary frames each comprising spaced parallel side members, the side members of said auxiliary frame being received between and pivotally connected to the sides of the main frame, a cover of fabric or like sheet material carried by said two frames, the side members of the main frame having end portions which project beyond the pivotal axis of interconnection of the two frames and are located outside the cover, and means for connecting said projecting end portions to said handle to support the main frame in a generally horizontal position the pivotal connection of the auxiliary frame to the main frame providing sufficient friction to maintain the auxiliary frame in any desired position of adjustment about the axis of such connection.

References Cited by the Examiner
UNITED STATES PATENTS

| | | | |
|---|---|---|---|
| 146,311 | 1/74 | Brown | 280—47.38 X |
| 2,241,799 | 5/41 | Welsh | 280—41 |
| 2,770,488 | 11/56 | Kuniholm et al. | 296—107 |
| 2,783,053 | 2/57 | Sheldrick et al. | 280—41 |
| 2,798,651 | 7/57 | Wasyluk. | |
| 2,982,562 | 5/61 | Gladstein | 280—36 |

A. HARRY LEVY, *Primary Examiner.*